United States Patent [19]

Hill et al.

[11] 4,133,654
[45] Jan. 9, 1979

[54] APPARATUS FOR TREATING EXHAUST GAS

[75] Inventors: John M. Hill, Nottingham; Brian R. Garnish, Loughborough, both of England

[73] Assignee: Becorit (G.B.) Limited, Nottingham, England

[21] Appl. No.: 749,808

[22] Filed: Dec. 13, 1976

[30] Foreign Application Priority Data

Jan. 31, 1976 [GB] United Kingdom ............... 3882/76

[51] Int. Cl.² ........................................... B01D 47/02
[52] U.S. Cl. ............................................ 55/222; 55/248; 55/256; 55/257 HE; 55/DIG. 30; 261/157; 261/161; 60/310; 60/321
[58] Field of Search ............... 55/222, 248, 255, 256, 55/257 HE, 260, 268, 269, 418, DIG. 30, 319; 261/157, 161; 60/310, 321

[56] References Cited

U.S. PATENT DOCUMENTS

| 1,599,131 | 9/1926 | Hill | 55/269 |
|---|---|---|---|
| 1,782,890 | 11/1930 | Elliott et al. | 55/222 |
| 1,943,297 | 1/1934 | Cook | 55/248 |
| 2,239,181 | 4/1941 | Smith | 55/222 |
| 2,527,004 | 10/1950 | Fett | 55/248 |
| 2,612,745 | 10/1952 | Vecchio | 55/222 |
| 2,686,399 | 8/1954 | Stoltz | 60/310 |
| 3,153,579 | 10/1964 | Levey et al. | 60/310 |
| 3,520,113 | 7/1970 | Stokes | 55/256 |
| 3,566,583 | 3/1971 | Ashmore | 55/255 |
| 3,801,696 | 4/1974 | Mark | 60/310 |

FOREIGN PATENT DOCUMENTS 507019  6/1971  Switzerland ............... 55/418

Primary Examiner—Frank W. Lutter
Assistant Examiner—David L. Lacey
Attorney, Agent, or Firm—Merriam, Marshall & Bicknell

[57] ABSTRACT

Apparatus for treatment of exhaust gas from internal combustion engines, for use in underground mine workings, comprises an exhaust pipe with a water jacket, and a conditioner chamber retaining a bath of water through which the exhaust gas flows in passing through the inlet to the outlet of the chamber, the chamber further including means for condensing water vaporized from the bath by passage of exhaust gas therethrough and for discharging such condensed water back to the bath. The apparatus may include a heat exchanger upstream of the conditioner chamber and containing a system of plates or webs which sub-divide the gas flow path through the heat exchanger into passageways, the plates or webs being connected to the inner wall of a water jacketed casing of the heat exchanger.

3 Claims, 10 Drawing Figures

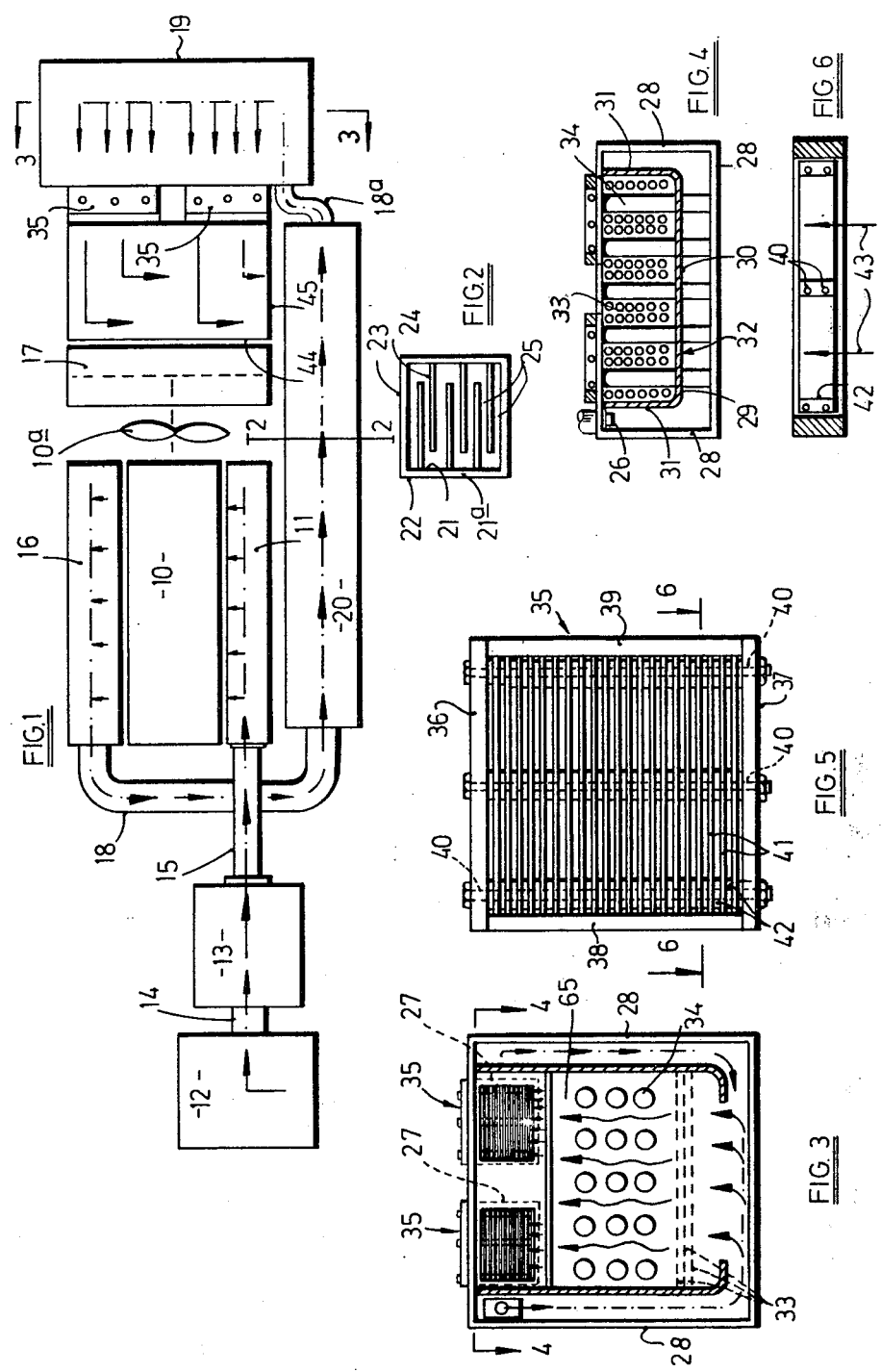

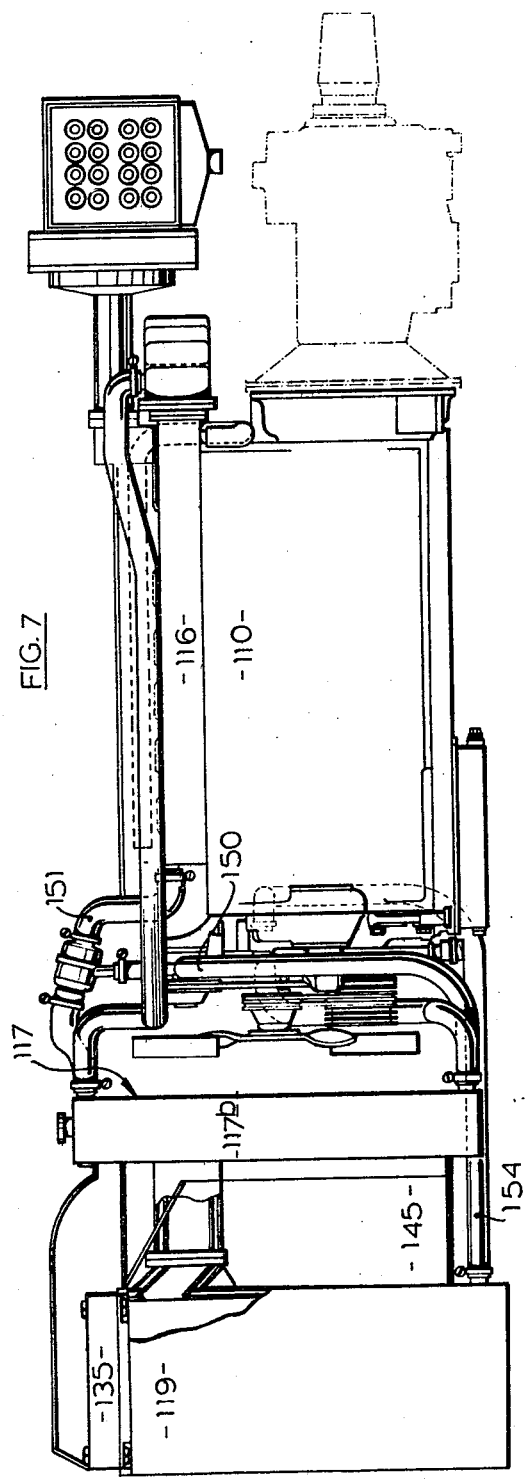

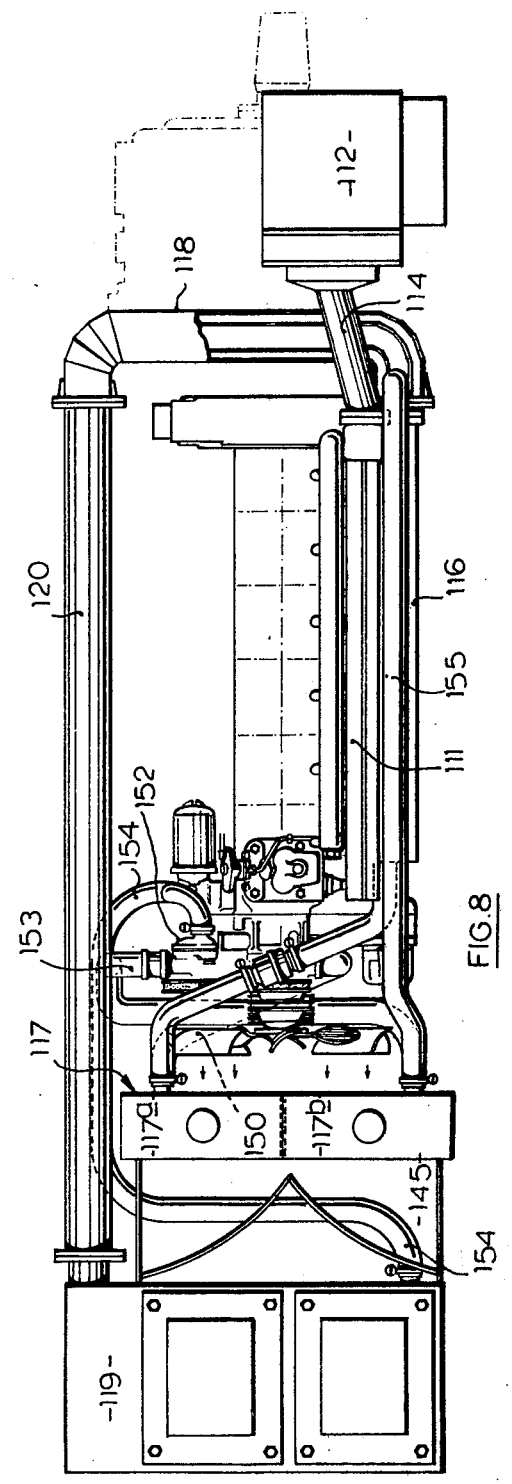

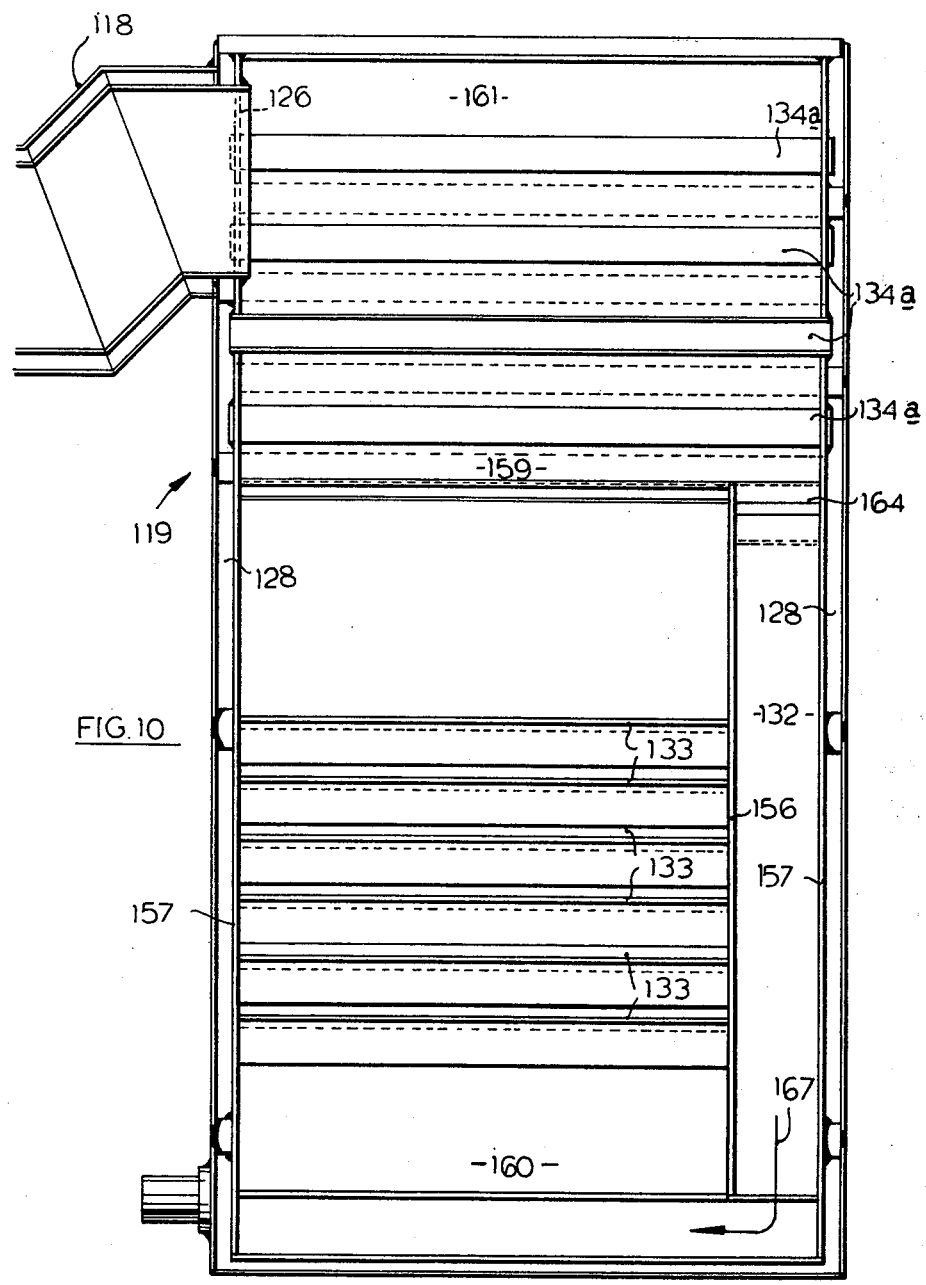

APPARATUS FOR TREATING EXHAUST GAS

BACKGROUND TO THE INVENTION

Field of the invention

This invention relates to internal combustion engines and specifically concerns apparatus for use in connection therewith for treating the exhaust gas delivered from the engine when in operation.

The invention has been developed primarily for treating the exhaust gas of internal combustion engines used in locomotives or otherwise in underground mine workings in which the composition of the atmosphere gives rise to a fire or explosion hazard. Regulations governing the use of internal combustion engines in such underground mine workings require that the engine and its exhaust system shall have complied with an officially approved specification governing inter alia:

(a) the maximum surface temperature of the engine and exhaust system thereof,
 (b) the temperature of the exhaust gases emergent from the exhaust system into the atmosphere,
 (c) the composition of the exhaust gases so emergent.

It is, however, to be understood that the invention may be applied to apparatus for treatment of the exhaust gas of internal combustion engines used in environments in which similar or analogous hazardous conditions arise, either less severe or more severe than those encountered in underground mine workings.

In apparatus of the character specified one of the problems which arises is control over the composition of the exhaust gas emergent into the atmosphere, and to exercise such control the apparatus usually includes a conditioner chamber containing a liquid (normally water) through which the exhaust gas is passed to dissolve or otherwise absorb noxious constituents. In apparatus of conventional design, however, the temperature at which the gas enters the conditioner chamber is often relatively high, e.g. 200° C or more and this leads to significant vaporization of the water contained in the chamber, and such water in the form of vapor may be entrained in the flow path of the exhaust gas leaving the conditioner chamber so that the volume of water contained therein is gradually reduced.

In underground mine workings it may be inconvenient, or even impossible, to return the locomotive to a service area or station in the underground working at frequent intervals to enable water to be added to the conditioner chamber, yet a hazardous condition may arise if the water level is allowed to fall too low.

SUMMARY OF THE INVENTION

The principal object of the present invention is to overcome or reduce this undesirable risk by reducing the loss of water from the conditioner chamber and hence lengthening the time interval for servicing the locomotive in this particular respect.

According to one aspect of the invention apparatus of the character referred to comprises an exhaust pipe having a jacket for flow of a cooling liquid therethrough, and a conditioner chamber for receiving exhaust gas from said pipe, the chamber being so constructed or arranged as to retain a bath of gas conditioning liquid, such as water, through which the exhaust gas is caused to flow in passing through the chamber from an inlet to an outlet thereof, the chamber further incorporating or containing a condensing means in the flow path of the gas after the latter leaves the bath and before it reaches the outlet, such condensing means being so arranged that liquid vaporized by passage of the exhaust gas through the liquid can condense for discharge back to the bath.

From a further aspect the invention resides in the provision of an apparatus of the character referred to comprising an exhaust pipe having a jacket for passage of cooling liquid therethrough for cooling the exhaust gas in contact with the inner surface of the exhaust pipe, and a conditioner chamber for receiving the exhaust gas from the exhaust pipe and constructed and arranged to retain a bath of gas conditioning liquid, such as water, through which the gas is caused to flow in passing from an inlet to an outlet of the chamber, and wherein the exhaust pipe incorporates, or is connected to, a heat exchanger through which the exhaust gas flows on its way to the conditioner chamber, such heat exchanger comprising a casing having a jacket through which cooling liquid can flow and which is provided internally with a system of plates or webs subdividing the flow path through the heat exchanger into a plurality of passageways, such plates or webs being connected to the inner wall of the casing to form heat conductive paths in the surfaces of the plates or webs to the wall of the casing. Preferably the plates or webs are arranged parallel or approximately parallel to each other and spaced apart in a direction normal to their faces to form a plurality of passageways each of which extends across the whole, or substantially the whole, width of the casing but is of smaller dimensions depthwise of the casing, i.e. normal to the surfaces of the plates or webs. While the passageways could be isolated or sealed from each other internally of the casing, each web or plate being connected in each of two opposing parts of the internal wall of the casing, it is preferred that each web or plate shall be connected to only one such part and be spaced from the other part with alternately positioned webs or plates connected to the same wall part. The passageways are preferably parallel or approximately so to the general flow path through the heat exchanger from one end to the opposite end of the casing.

Further, it is advantageous for both aspects of the invention to be employed in combination so that, not only is the degree of vaporization reduced by reason of the lower temperature of the exhaust gas entering the conditioner chamber, but loss of liquid therefrom by reason of any vaporization which does take place is minimized by condensation and feed back of the condensed liquid thereby preventing the vapor from becoming entrained in the exhaust gas flowing out of the conditioner chamber.

It will of course be understood that the apparatus may include other devices which are employed in exhaust treatment apparatus. Thus a flame trap means may be connected so as to be operative in the exhaust gas flow path either upstream or downstream of the conditioner chamber. Further, a diluter means may be connected in the exhaust gas flow path preferably downstream of the conditioner chamber, such diluter means serving to mix the exhaust gas with environmental atmospheric constituents before discharge into the environment.

BRIEF DESCRIPTION OF DRAWINGS

The invention will now be described, by way of example, with reference to the accompanying drawings wherein:

FIG. 1 is a plan view of an internal combustion engine to which one embodiment of exhaust treatment apparatus in accordance with the present invention is applied, the apparatus being illustrated diagrammatically;

FIG. 2 is a fragmentary view in cross-section and on an enlarged scale on the line 2—2 of FIG. 1;

FIG. 3 is a fragmentary view in vertical cross-section on the line 3—3 of FIG. 1 showing the internal construction of the conditioner chamber;

FIG. 4 is a plan view in cross-section on the line 4—4 of FIG. 3;

FIG. 5 is a fragmentary view on an enlarged scale and in end elevation showing one of the flame trap units which may be employed in conjunction with the outlet of the conditioner chamber;

FIG. 6 is a cross-sectional view on the line 6—6 of FIG. 5;

FIG. 7 is a view in side elevation of a constructional embodiment of an apparatus in accordance with the invention as applied to an internal combustion engine;

FIG. 8 is a plan view of the embodiment of FIG. 7.

FIG. 10 is a view of the conditioner chamber of FIG. 9 in end elevation and in cross-section on the line 10—10 of FIG. 9.

DESCRIPTION OF PREFERRED EMBODIMENTS

Figure 9:
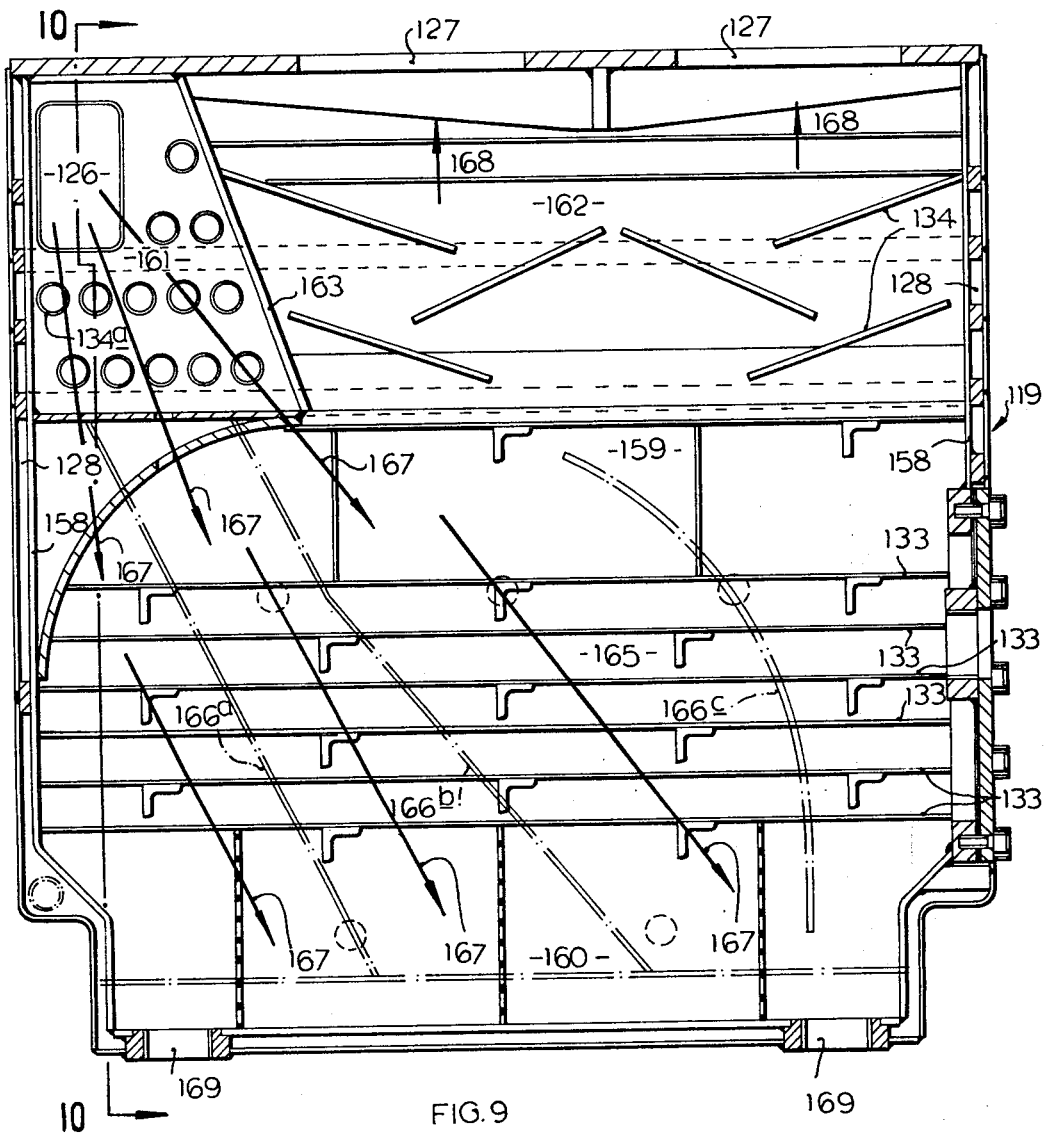
FIG. 9 is a view in front elevation and in vertical cross-section showing the internal construction of one form of the conditioner chamber which may be incorporated in the apparatus of FIGS. 7 and 8.

The apparatus illustrated is applied to an internal combustion engine of which the cylinder block 10 is connected at one side to an inlet manifold 11 supplied with air through an air filter/cleaner device 12, pipe 14 a flame trap unit 13, and pipe 15, and at the other side delivers exhaust into a manifold 16.

The exhaust manifold 16 may comprise a casing having inner and outer walls defining a water jacket which extends substantially over the whole area of the casing, such water jacket being connected in a water circulating system incorporating a radiator or heat exchanger 17 (the appropriate connecting pipes being omitted for simplicity). Circulation may be forced flow by means of a water circulating pump (not shown) driven by the engine.

Exhaust gases may be delivered from the end of the manifold remote from the radiator 17 into an exhaust pipe 18 which is itself water jacketed. The exhaust pipe 18 may be of smaller cross-section than the manifold casing. The water jacket (not specifically shown) of the pipe 18 may, as in the case of the manifold, extend substantially over the whole surface area but the exhaust pipe may have a plane or simple internal surface, i.e. present a single passageway for the flow of all of the exhaust gas emergent from the manifold 16.

A continuation 18a of the exhaust pipe 18 serves to deliver the exhaust gas to a conditioner chamber 19 but in between the pipes 18 and 18a the flow path for the exhaust gas is afforded by an interior duct extending through a heat exchanger 20 having a larger internal cross-sectional area normal to the gas flow path than that of the exhaust pipe.

It is advantageous to some extent that the exhaust pipe 18 is connected to the end of exhaust manifold 16 remote from the conditioner chamber 19 since this intrinsically provides a longer path for the exhaust to follow than would be the case were it connected to the end of the manifold 16 nearest the conditioner chamber. The greater length of exhaust pipe provides the opportunity for more extensive heat exchange between the exhaust gas and the cooling water flowing through the jacket of the exhaust pipe. However, even this may be inadequate to reduce the temperature of the exhaust gas immediately prior to its entry into the conditioner chamber to as low a value as is desirable, and the purpose of the heat exchanger 20 is to achieve this temperature reduction.

As seen in cross-section the heat exchanger comprises a casing 23 having inner and outer walls 21, 22 defining a water space 21a connected in the cooling water flow system already mentioned. Internally the heat exchanger casing is sub-divided by a plurality of plates 24 which are connected to at least one, and possibly to two, opposing wall parts of the inner wall 21 and the latter to the other of such wall parts, the casing conveniently but not essentially being of square or rectangular shape in cross-section.

As shown, the plates 24 are parallel to each other and each terminates at a position spaced from the wall part to which it is not connected so as to define individual passageways 25 which do in fact communicate with each other although it would be possible for the plates 24 to be connected to both opposing wall parts so that each passageway is isolated from that or those adjacent thereto.

The plates 24 are connected to the associated parts of the inner wall 21 in a manner providing for heat conduction from the plates to such wall so that the plates effectively extend the heat forming surface in contact with the exhaust gas.

Flow of cooling liquid through the space 21a in the heat exchanger and in the exhaust pipe 18 may be such that the flow path runs counter to the flow path of the exhaust gas whereby the coolest exhaust gas is transmitting heat to the coolest water and hottest exhaust gas transmitting heat to the hottest water.

Connection to the downstream end of the heat exchanger 20 to the conditioner chamber 19 may be by way of a short section 18a of exhaust pipe similar in construction to the pipe 18, i.e. incorporating a water jacket contained in the cooling liquid flow path as mentioned.

Referring now to the conditioner chamber illustrated in more detail in FIGS. 3 and 4, an inlet 26 thereto for the exhaust gas is provided in the upper part of the casing of the chamber preferably adjacent to one side thereof, and outlets are also provided in the upper part of the same wall as indicated generally at 27, FIG. 3 (although these outlets may be in the top wall if desired as hereinafter referred to). The casing of the chamber 19 is again of double walled form so as to afford a water space 28 for cooling water.

Internally the chamber is provided with a partition 29 having a back wall 30 extending parallel or approximately so to the adjacent wall of the casing, i.e. that remote from the inlet and outlets, and two side walls 31 respectively adjacent to but spaced from opposing side walls of the casing, the whole defining a duct 32 of generally U-shaped form in plan leading downwardly from the inlet 26 to the lower part of the chamber.

Between the front wall of the casing in which the inlet and outlet is provided and the rear wall 30 of the partition, the casing affords an upwardly extending duct 65 which contains a number of horizontally disposed perforated plates 33 which span the space between the rear wall 30 of the partition and the front wall of the casing, and in use the chamber is filled with water to a level just above the uppermost one of the perforated plates 33. Exhaust gases may contain sulphur dioxide which, when dissolved in the water, would tend to render the latter acidic and consequently the initial charge of water may have an alkaline substance dissolved in it to counteract this effect. Further, the parts of the conditioner chamber in contact with the water are preferably made from stainless steel or other metal resistant to corrosive attack.

Above the perforated plates 33 the front and rear walls of the casing are spanned by tubes such as 34 arranged in horizontal rows one above the other, these tubes serving to connect the water spaces 28 of the front and rear walls of the casing.

In operation exhaust gas flows in through the inlet 26 and then downwardly in the space between the walls 30, 31 of the partition and the respectively adjacent walls of the casing so as to enter the water and bubble up through the perforated plates 33. Any vaporization of the water results in the vapor being present in the zone immediately above the perforated plates where the tubes 34 are present. The construction of the conditioner chamber, and in particular the water spaces of the front and rear walls of the casing, is that cooling water flows through the tubes 34, and the latter hence act as a condensor means so that such vapor condenses on the tubes 34 and drips back into the water bath contained in the casing. If desired the tubes in successive horizontal rows may be offset horizontally, i.e. staggered.

Overlying the outlets 27, whether in the front wall or in the top wall, are flame trap units 35 not shown in FIG. 4. In principle the flame trap units comprise structure defining a plurality of passageways of small cross-section through which the exhaust gas flows with resultant cooling both by contact with the walls defining the passageways and to some extent adiabatically to lower the temperature to a value at which any flames are extinguished. The flame trap units may each comprise an outer frame composed of opposed members 36, 37 and 38, 39, the former pair being connected by tie rods 40 extending through apertures in a stack of plates 41 held apart by spacers 42 on the tie rods. The passage of exhaust gas is indicated by arrows 43 in FIG. 6.

The emergent exhaust gas passes into a dilutor chamber 44 to which air from the external environment is fed through the radiator 17 by means of an engine driven fan 10a, such air becoming mixed with the exhaust gas preparatory to delivery from an outlet 45 from the chamber 44.

The radiator 17 may incorporate two radiator sections or units having water passageways which do not communicate with each other. One of these sections or units may be connected in a circuit containing the water jackets of the exhaust pipe 18, heat exchanger 20 and conditioner chamber 19 (and possibly the water jacket of the exhaust manifold 16.). The other sectional unit may be connected to the water passageways of the engine block (and the water jacket of the exhaust manifold 16 if the latter is not connected to the first mentioned section or unit of the radiator).

If the flame trap units are mounted over apertures in the top wall of the conditioner chamber, the outlet sides would be connected to a duct leading to the diluter chamber 44 or the latter could be formed with an extension overlying the upper sides of the flame trap units.

In the constructional embodiment illustrated in FIGS. 7 to 10 parts corresponding to those already described are designated by like references with the prefix 100 and the preceding description is to be deemed to apply. The following description is, therefore, substantially confined to identification of parts not shown in the diagrammatic drawings and to differences of construction where these exist.

Referring firstly to FIGS. 7 and 8, the supply of cooling water for the manifold, the exhaust pipe heat exchanger and the conditioner chamber is derived as follows.

As in the diagrammatic embodiment, the radiator 117 is sub-divided into two separate units or sections 117a and 117b. The unit 117a supplies cooling water to the engine 110 and exhaust manifold 116 by way of a feed pipe 150 and a return pipe 151. Radiator unit 117b and water pump 152 are connected in a water cooling circuit for the exhaust pipe 120 and conditioner chamber 119. Thus, the inlet of the pipe 152 is connected by a water return pipe 153 to the lower end of radiator unit 117b. A feed pipe 154 is connected from the outlet of the pump 152 to an inlet adjacent to the lower end of the conditioner chamber 119 to communicate with the water space 128 thereof. Such water space communicates with the annular or the like water space afforded by the heat exchanger for the exhaust pipe 120 and this water space is connected by a return pipe 155 to the upper end of the radiator unit 117b.

It will thus be noted that the path along which the exhaust travels from the manifold 116 to the outlet in the dilution chamber 145 is enclosed along its entire length by water jacket means through which water is caused to flow by operation of the pump 152.

Referring now to FIGS. 9 and 10, the arrangement of internal partitioning of the conditioner chamber differs somewhat from that illustrated diagrammatically. Thus the lower part of the chamber contains a vertical partition 156 which is parallel, and spaced inwardly from, adjacent rear wall 157 of the chamber and is connected to end walls 158 to form an upwardly extending duct 165 open at its upper and lower ends 159, 160 and spanned internally by the perforated plates 133.

The inlet 126 for the exhaust gas communicates with a compartment 161 which extends across the whole distance between the front and rear walls 157 and is separated in the upper part of the chamber from an outlet compartment 162 by an inclined partition wall 163. The duct 165 bounded by the partition wall 156, adjacent rear wall 157 and the end walls 158 communicates with the compartment 162 through the open upper end 159 of the duct but this upper end is shut off from direct communication with the inlet compartment 161 by the partition wall 163 which extends between the partition wall 156 and the other one of the rear walls 157. The inlet compartment 161 thus communicates with a narrower duct 132 extending to the lower part of the conditioner chamber, and which may be subdivided internally by guide or distributor plates 166a, 166b and 166c to cause exhaust gases to be distributed in a more or less uniform manner as indicated by arrows 167 into the lower part of the conditioner chamber. The conditioner chamber contains the water previously mentioned up to a level extending above the lower boundaries of the partition 156 so that the gas is caused to bubble up through the water from the lower end 160 to the upper end 159 of the central duct 165 and through the perforations of the plates 133 as indicated by the further arrows 168.

The heat exchanger means provided in this embodiment comprises tubes 134a (FIGS. 9 and 10) connected to the inner wall 157 forming the inner boundary of each space 128, the tubes spanning the inlet compartment 161. Also, baffle members 134 in the form of plates are secured to opposing front and rear walls 157 of the casing and are thereby in thermal communication with water traversing the space 128.

These plates are, therefore, able to act as condensing surfaces and are so arranged as to define the tortuous passageways for the upward flow of gas in the chamber 162 which communicates at the upper end 159 of the outlet duct.

The baffle plates are inclined to the horizontal and, therefore, vapor condensing on them to liquid runs down to the lower edges of the plates and drips back into the bath of conditioning liquid, the normal level of which will be just above the uppermost perforated plate 133.

In this construction the flame trap units 135 are conveniently mounted horizontally over the outlet openings 127 in the top walls of the conditioner chamber.

The bottom wall may be fitted with removable drain plugs in openings 169.

We claim:

1. In apparatus for treating exhaust gas from an internal combustion engine comprising an exhaust pipe having a jacket for the flow of cooling liquid therethrough and a conditioner chamber for receiving exhaust gas from said pipe, the improvement wherein the conditioner chamber comprises:
   a. an outer casing having a water jacket defined between an inner wall and an outer wall of said casing for circulation through said jacket of cooling water, said casing including a lower portion containing a bath of gas conditioning liquid and an upper portion having an exhaust gas inlet, connected to said pipe, and having an exhaust gas outlet,
   b. duct means defining a flow path internally of said casing from said inlet through at least a portion of the surface of said liquid bath extending to a position adjacent to the lower end of said casing, said duct means being connected to said inner wall of said water jacket,
   c. means in the lower portion of said casing and immersed in said bath for causing bubbles of the exhaust gas to form at horizontally distributed positions and travel upwardly through said bath from said position to the surface of said bath,
   d. condensing means in the upper portion of said casing for contacting exhaust gas leaving the surface of said bath in the flow of said exhaust gas towards said outlet, said condensing means defining a plurality of flow paths in parallel with each other and having surfaces for drip-back of condensed liquid to said path, and being connected to said inner wall for heat extraction from said condensing means to said water in said water jacket.

2. Apparatus according to claim 1 wherein:
   (i) said duct means has an upper end communicating with an internal chamber in said casing, said chamber being situated immediately adjacent to said exhaust gas inlet, said upper end of said duct means having a smaller cross-section transverse to the flow path defined thereby than that at its lower end,
   (ii) said duct means contains guide members defining passageways within said duct means which passageways are divergent in a downward direction.

3. The apparatus claimed in claim 1 wherein:
   a. said casing has an internal partition in said upper portion of said casing dividing said upper portion into an inlet compartment, communicating directly with said exhaust gas inlet; and an outlet compartment,
   b. said casing has a further partition transverse to the first said partition extending from the lower end of said inlet compartment to said position adjacent to the lower end of said casing.

* * * * *